United States Patent [19]

Moore et al.

[11] Patent Number: 5,476,164

[45] Date of Patent: Dec. 19, 1995

[54] SOLENOID ACTUATED MECHANICAL CLUTCH

[75] Inventors: Keith O. Moore, N. Dartmouth; Diederik G. F. Berghauser-Pont, S. Dartmouth, both of Mass.

[73] Assignee: Regal-Beloit Corporation, Beloit, Wis.

[21] Appl. No.: 304,067

[22] Filed: Sep. 12, 1994

[51] Int. Cl.[6] .................................................. F16D 21/04
[52] U.S. Cl. .................. 192/51; 192/48.2; 74/356
[58] Field of Search .................. 192/51, 21, 48.92, 192/48.2; 74/322, 356

[56] References Cited

U.S. PATENT DOCUMENTS

| | | | |
|---|---|---|---|
| 2,872,003 | 2/1959 | Nussbaumer | 192/51 |
| 3,204,478 | 9/1965 | Thelin | 192/51 X |
| 3,350,949 | 11/1967 | Rapoza | 192/51 |
| 3,757,822 | 9/1973 | Kell | 192/51 X |
| 3,830,350 | 8/1974 | Worthen et al. | 192/48.5 X |
| 4,570,768 | 2/1986 | Nishimura et al. | 192/48.2 X |
| 4,679,673 | 7/1987 | Yamaoka et al. | 192/21 |
| 4,679,682 | 7/1987 | Gray, Jr. et al. | 192/21 |
| 4,844,221 | 7/1989 | Sakai et al. | 192/51 X |
| 4,966,267 | 10/1990 | Carlton | 192/48.91 |
| 5,046,592 | 9/1991 | Mainquist et al. | 192/51 X |

*Primary Examiner*—Andrea L. Pitts

[57] ABSTRACT

A solenoid operated actuator mechanism for positioning a shift fork in a double clutch arrangement for use in a transmission includes a pair of solenoid actuators operatively connected to a shaft that is fixed to the shift fork for positioning the shift fork in a neutral position when the solenoid actuators are de-energized and for positioning the shaft and shift fork selectively in a forward or reverse location if one or the other of the solenoids are energized. The invention includes a first embodiment where the shaft is fixed to the shift fork and to one end of a solenoid core element and wherein the forward and reverse solenoid assemblies are located on one side of the shaft; a second embodiment includes a shaft having end portions forming solenoid core elements.

28 Claims, 5 Drawing Sheets

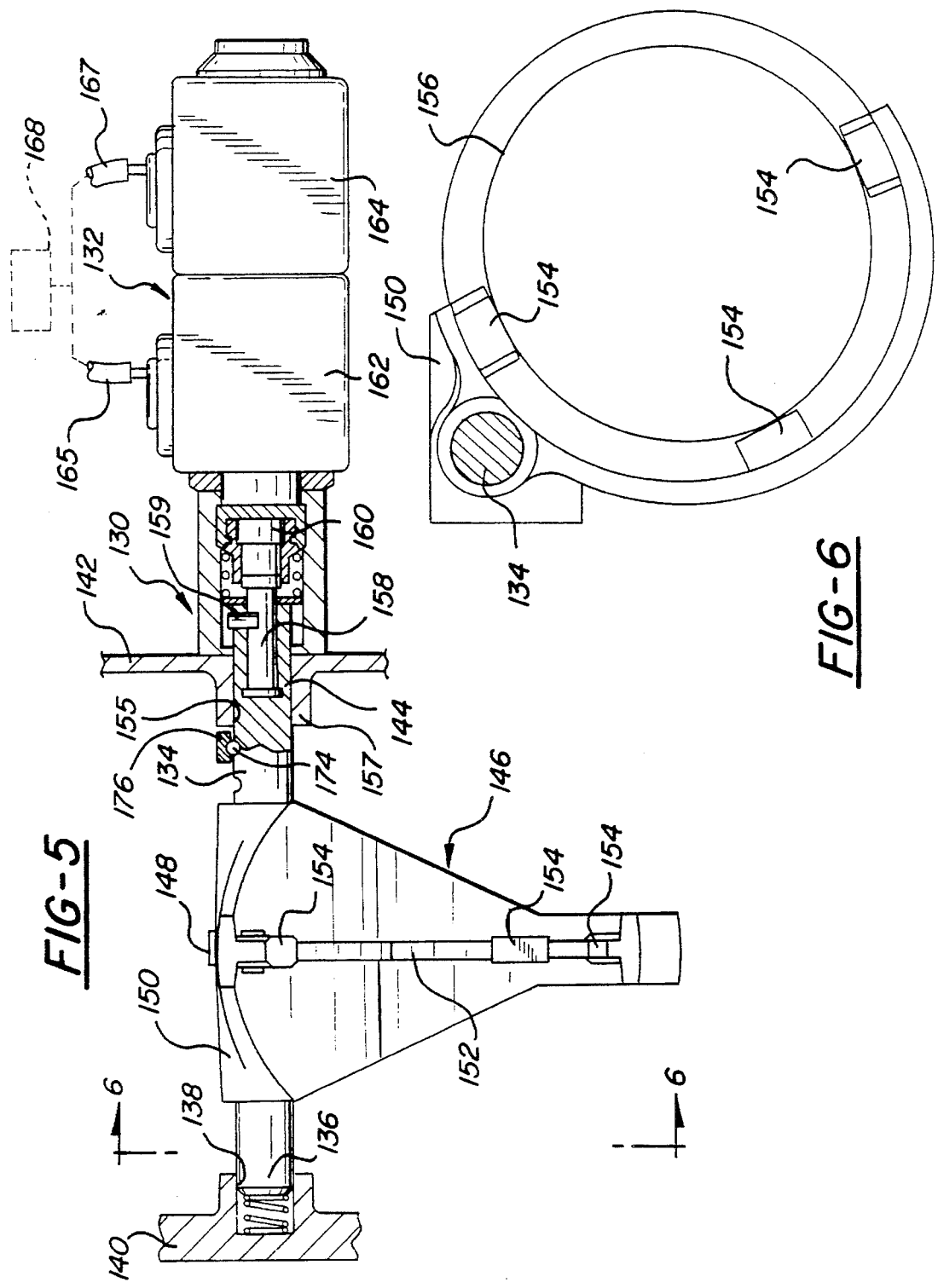

5,476,164

SOLENOID ACTUATED MECHANICAL CLUTCH

BACKGROUND OF THE INVENTION

1. Field of the Invention

This invention relates to a transmission and more particularly to a solenoid operated actuator for positioning a clutch arrangement in a transmission.

2. Description of the Prior Art

In marine drives it is desirable to provide a double clutch type clutching arrangement of the type set forth in U.S. Pat. No. 4,966,267 wherein a shaft collar is provided between a pair of actuated clutch mechanisms for positioning an output shaft to locate forward and reverse gears to transfer power from an input shaft to the output shaft in either a reverse or forward mode and wherein the shift collar is locatable in a neutral position. The shift collar is connected to a shift fork that provides for axial movement of the shift collar in response to manual positioning of an actuator arm identified by reference numeral 65 in the '267 patent. The actuator arm 65 constitutes the input to a manual shift 10 shown in Prior Art FIGS. 1 and 2. The actuator arm 65 of manual shift 10 is connected to a rotatable shaft 12 that carries an eccentric 14 on the end thereof. The manual shift 10 is bolted to the transmission housing at one end thereof by a connection plate 16 that forms a journal for a bearing and seal assembly 18 that rotatably supports and seals the shaft 12 with respect to the housing of the transmission. The eccentric 14 engages an end portion 19 of a shift fork 20 that is slidably supported on a selector shaft 22 carried by the transmission in spaced parallelism to the output shaft of the transmission. When the actuator arm 65 is positioned vertically as shown in FIG. 1, the transmission is in neutral. When the actuator arm 65 is moved either into the position 65a or 65b, the clutch mechanisms of the transmission are positioned to produce either reverse or forward drive as more particularly set forth in U.S. Pat. No. 4,966,267 that is incorporated herein by reference.

While suitable for its intended purpose, the shift actuator in the '267 patent requires manual positioning. Furthermore, lateral movement of the shift fork on the selector shaft can cause undesirable wear.

SUMMARY OF THE INVENTION

An object of the present invention is to provide a solenoid actuated clutching arrangement for controlling the output drive of a transmission in which a shift collar is coupled to an output shaft for rotation therewith and is further coupled to a shift or selector fork that is axially shifted by a solenoid actuator for moving the shift collar to actuate either a single clutch or a double clutch arrangement.

A further object of the present invention is to provide a solenoid actuated, double clutch type clutching arrangement for controlling the output shaft of a marine transmission between neutral, forward and reverse positions while eliminating sliding movement wear between the shift fork and a selector shaft portion of the actuator mechanism.

A still further object of the present invention is to provide a compact actuator mechanism for operating a double clutch arrangement for a marine transmission having an input shaft, an output shaft, axially spaced first forward and reverse gears mounted for rotation with the input shaft, axially spaced second forward and reverse gears mounted for rotation on the output shaft and wherein the forward gears on the two shafts are located in meshing engagement and wherein the transmission includes an idler shaft carrying an idler gear in meshing engagement with the reverse gears on the two shafts and a double clutch arrangement that encompasses the output shaft for actuating the output shaft in either a forward or reverse direction by selectively coupling the forward and reverse gears thereon and wherein the output shaft and clutches thereon are positioned by a shift collar that is located between spaced first and second clutches and the shift collar is a unitary member having an inner cylindrical sleeve portion and an outer cylindrical sleeve portion; the outer cylindrical sleeve portion being operatively connected to a solenoid actuated shift fork that is fixedly secured to a selector shaft to prevent wear therebetween.

A feature of the present invention is to provide such aforedescribed arrangements wherein the shift fork is actuated by a solenoid for causing movement of the shift collar to actuate the clutching device.

A further feature of the present invention is to provide such an arrangement wherein a selector shaft is moved by the solenoid.

A still further feature of the present invention is to provide such an arrangement wherein a selector shaft is fixed to a transmission casing and the shift fork is actuated by a solenoid for causing movement of the shift collar to actuate the clutching device.

Yet another feature of the present invention is to provide such an arrangement wherein the solenoid actuators are located on one end of the selector shaft and are connected thereto by the core elements of the solenoids.

Still another feature of the present invention is to provide such an arrangement wherein the solenoids are located on either side of the shift fork and are connected to the shift fork for moving it on a rod element as the shift fork positions the shift collar to actuate a clutch.

Yet another feature of the present invention is to provide such an arrangement wherein the solenoids are formed in a compact configuration with respect to the shift fork by having a core element of each of a pair of solenoid actuators forming a selector shaft connected to the shift fork.

Still another object of the present invention is to provide a detent that will position the selector shaft in a mid neutral position upon momentary energization of one of the pair of solenoid actuators.

Yet another feature of the present invention is to provide such an arrangement wherein a guide for the selector shaft is formed by spool elements of the solenoid actuators.

A still further feature of the present invention is to provide such an arrangement wherein the mid neutral position of the actuator shaft is provided by a pair of positioning springs located in bosses fixedly secured at opposite spaced points on the interior of the transmission housing for supporting the spool elements in axial alignment such that the energization of either one of the actuator coils will position the shift fork either in a forward drive position, a reverse drive position or when de-energized the springs will return the shift fork into a neutral position.

Brief Description of the Invention

This invention pertains to a clutching arrangement for a marine transmission or any other place where a mechanical clutch is desired that has a high torque capacity and a small engagement and disengagement force for a shift lever. The clutching arrangement is actuated by a shift lever that is fixedly connected to a selector shaft that is selectively positioned either in a forward or a reverse position by selective energization of one of a pair of solenoid actuators that are located coaxial of a selector shaft for providing a direct axial transfer of the shift fork between its various control positions so as to prevent wear between the shift fork and its actuator.

In one embodiment, the solenoid actuators are located laterally of the selector shaft at one side thereof for providing drive of the selector shaft.

In another embodiment, the solenoid actuators are located internally of the transmission housing and are located on opposite sides of the selector shaft. The selector shaft constitutes the operative core elements of the solenoids. Springs supported on a boss secured to the housing and in the spools of the solenoid actuators position the selector shaft in a mid neutral location. The spools serve as a guide.

The above and other objects and features of this invention will be more apparent from the following description in connection with the following drawings:

BRIEF DESCRIPTION OF THE DRAWINGS

FIG. 5 is a fragmentary sectional view partly in elevation taken along the line 5—5 of FIG. 3 looking in the direction of the arrows;

FIG. 6 is a sectional view taken along the line 6—6 of FIG. 5 showing the transmission case in elevation with its cover removed and;

DETAILED DESCRIPTION OF PREFERRED EMBODIMENT OF THE INVENTION

Figure 1:
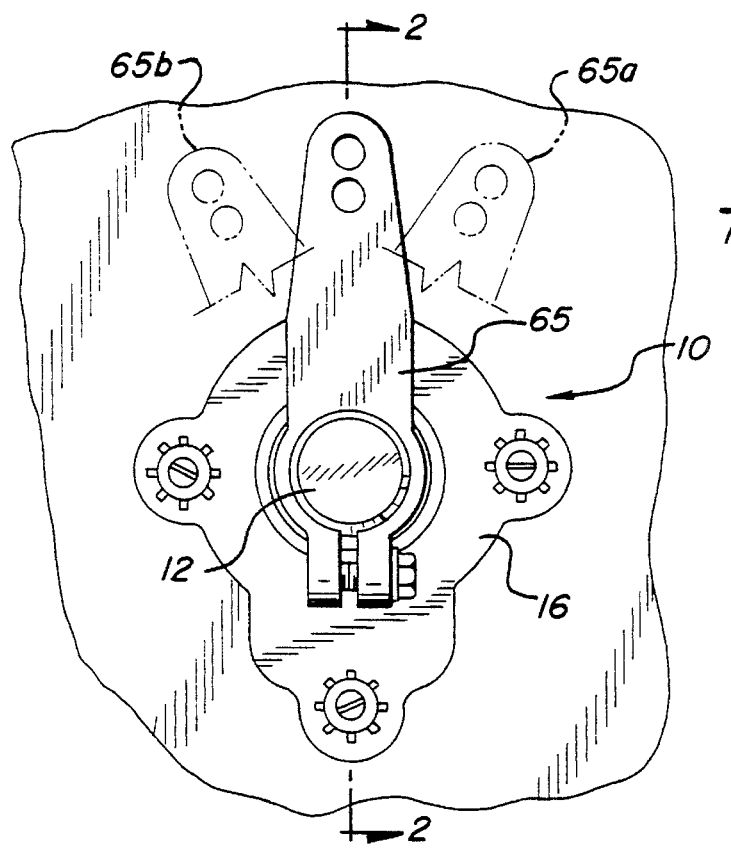
FIG. 1 is a fragmentary end elevational view of a prior art mechanical actuator for the shift fork for a double clutch arrangement in a marine transmission having a neutral, forward and reverse operation.
Figure 2:
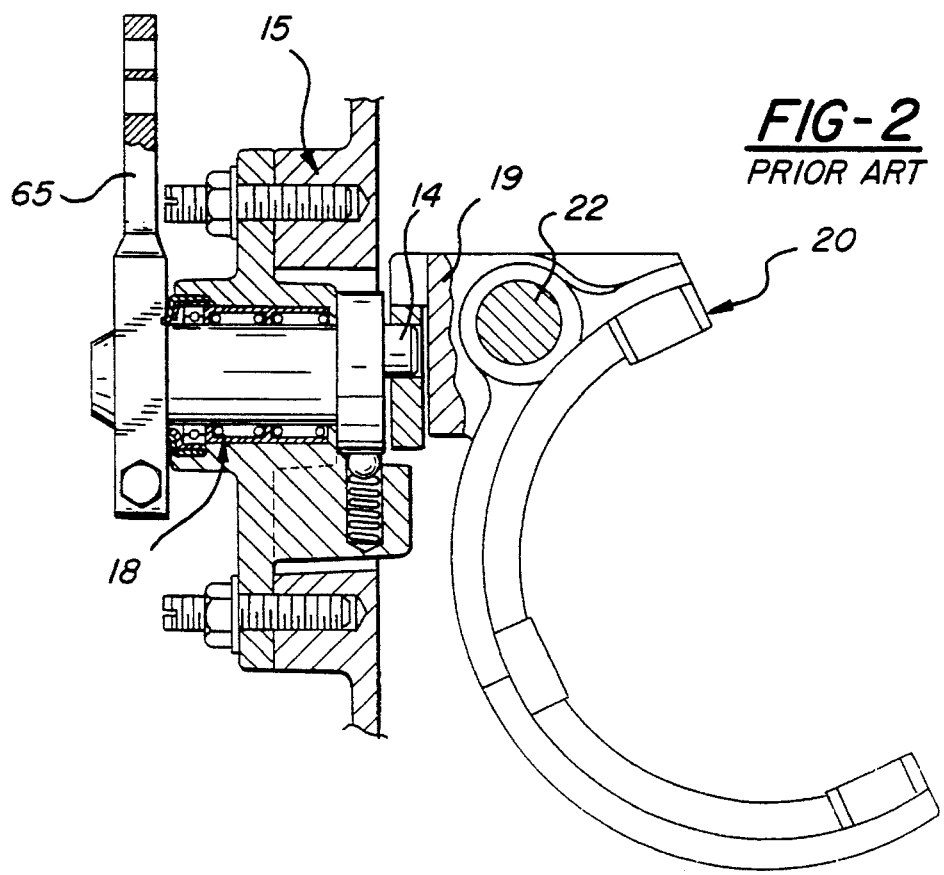
FIG. 2 is a fragmentary sectional view taken along the line 2—2 of FIG. 1 looking in the direction of the arrows.
Figure 3:
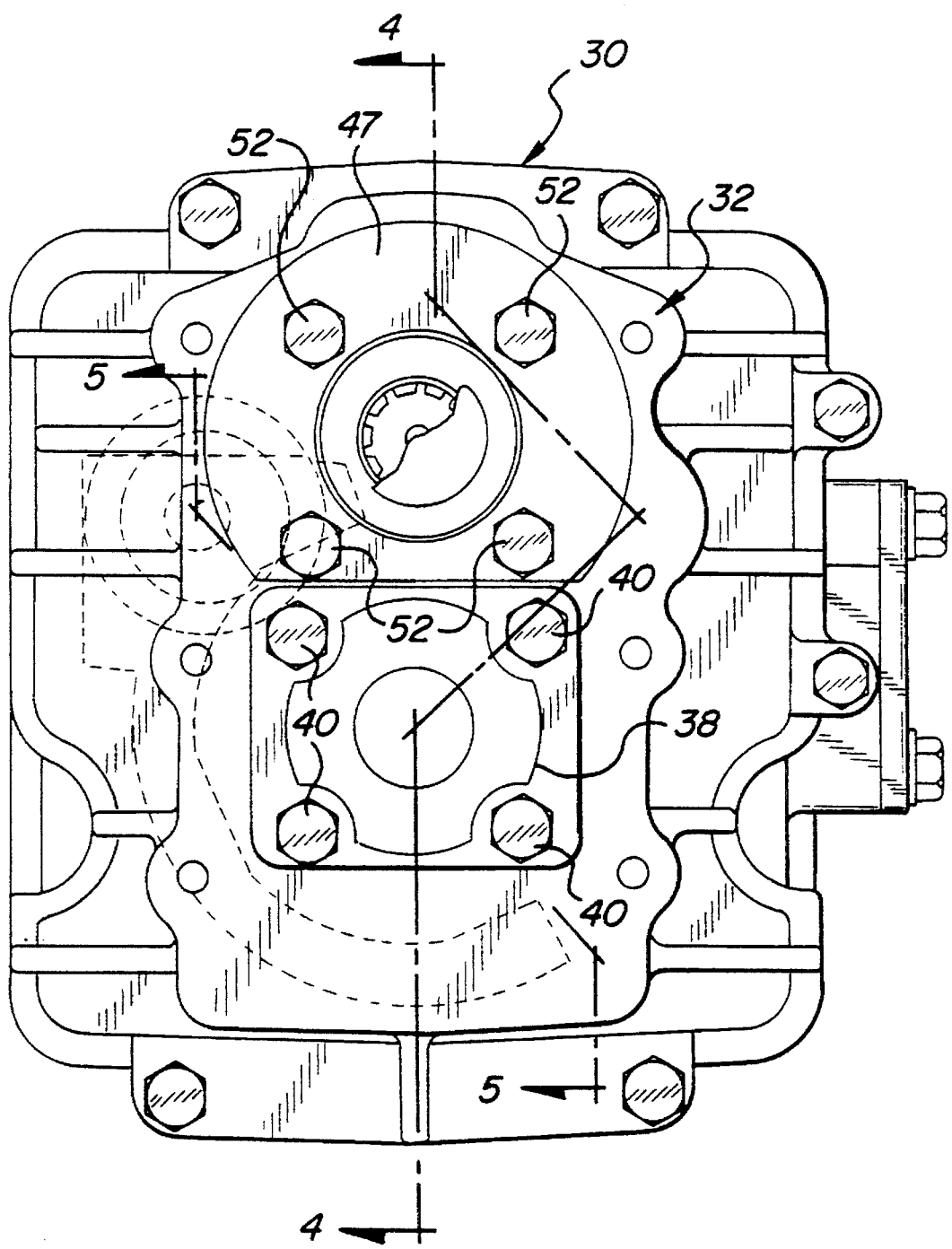
FIG. 3 is an end elevational view of a marine transmission embodying a solenoid actuated mechanical clutch according to the present invention.
Figure 4:
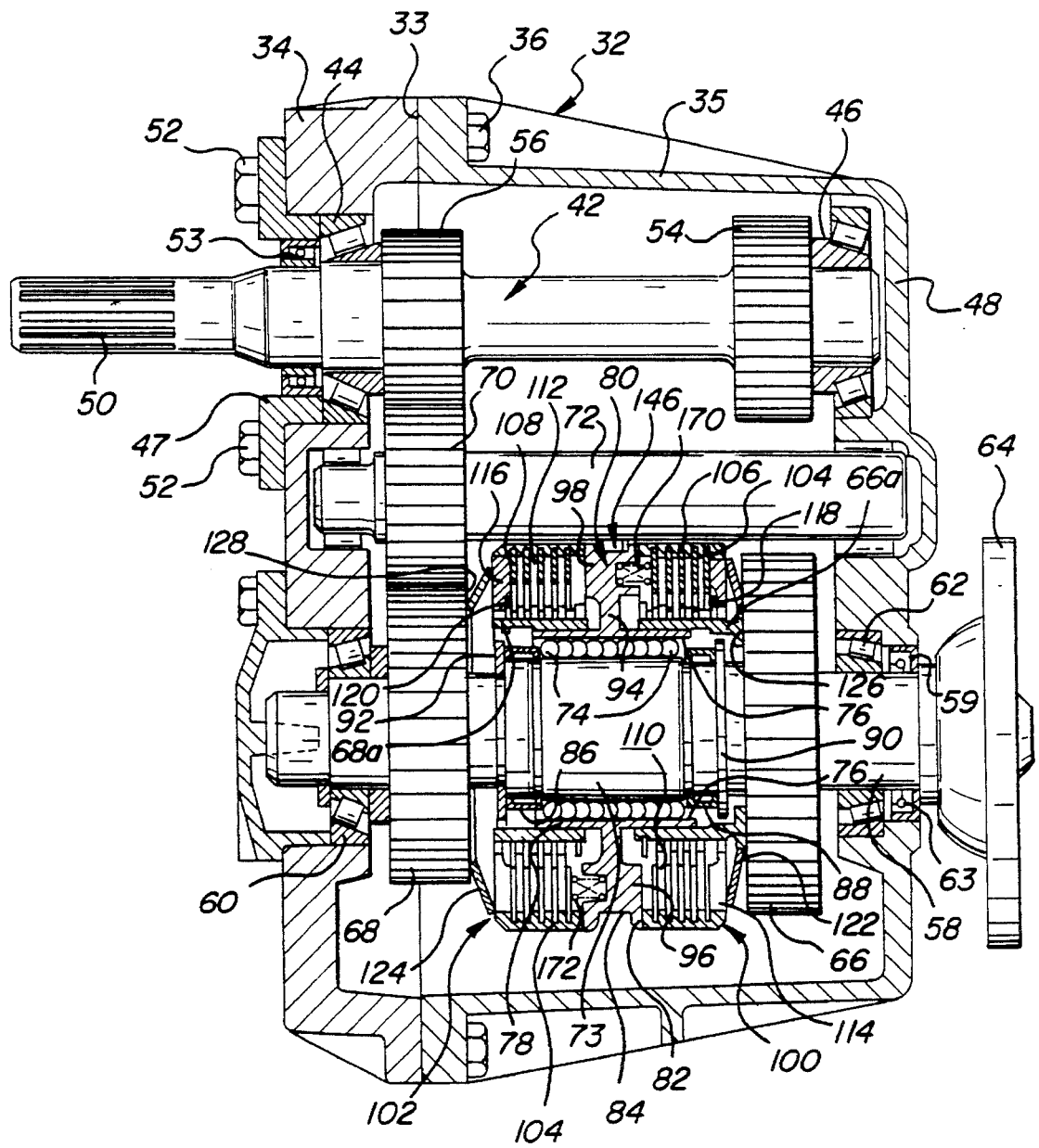
FIG. 4 is a sectional view taken on the line 4—4 of FIG. 3 looking in the direction of the arrows.

Referring more particularly to the drawings, FIGS. 3 and 4 disclose a transmission 30 such as a marine transmission, that is improved by the present invention. In the illustrated arrangement, the marine transmission 30 includes a two part housing 32 with a split line 33 formed between a front cover 34 and a main case 35. The front cover 34 and main case 35 are connected by screws 36 directed through the split line 33.

Mounted for rotation in the housing and end plate is an input shaft 42 received in spaced bearings 44, 46, respectively supported in cover 34 and the end wall 48 of the housing 32. The input shaft 42 has an end 50 projecting through a bearing and seal cap 47 for connection to suitable driving means such as a marine engine (not shown). Bearing and seal cap 47 is connected to cover 34 by screws 52 to cover a suitable seal 53 that encompasses shaft 42 to prevent leakage of lubricant from the housing 32. The shaft 42 is provided with a forward gear 54 and an axially spaced reverse gear 56 mounted thereon to rotate therewith.

An output shaft 58 is covered at one end by bearing and seal cap 38 connected to the front cover by screws 40. The output shaft 58 is also rotatably mounted in the housing by axially spaced bearings 60, 62, respectively, supported in the front cover 34 and the end wall 48. The shaft 58 projects through the wall 48 through a seal assembly 63 to terminate in a flange 64 for connection with a propeller or other final drive assembly (not shown).

Mounted for rotation on the output shaft 58 by needle bearings (not shown) are a forward gear 66 and an axially spaced reverse gear 68. The forward gear 66 meshes with the forward gear 54 on shaft 52 while the reverse gear 68 meshes with an idler gear 70 on an intermediate shaft 72 that is rotatably mounted in the transmission housing behind and between the shafts 42 and 58. The idler gear 70 also meshes with the reverse gear 56. Both the forward gears 54 and 66 and the reverse gears 56 and 68 rotate continuously during operation of the transmission.

The illustrated drive system including bearings, seals, fasteners and the like are shown somewhat diagrammatically with it being understood that the details of which are well known to those skilled in the art and form no part of the present invention that has application to other shaft and gear arrangements in a variety of other transmissions.

In the illustrated arrangement, an enlarged diameter portion 73 on the shaft 58 receives a plurality of balls 74 that are contained within partial ball grooves 76 formed on the inner cylindrical sleeve portion 78 of a shift collar 80. The shift collar 80 further includes an outer cylindrical sleeve portion 82 having an annular groove 84 formed therein. The balls 74 are retained in the partial ball grooves 76 by a pair of axially spaced retainer rings 86, 88 that are held in place by split lock rings 90, 92 respectively.

The inner cylindrical sleeve portion 78 and the outer cylindrical sleeve portion 82 are joined by a radial wall or flange 94 with enlarged end portions 96, 98 that define pistons for opposed clutch plate packs 100, 102 on either side of the shift collar 80. The outer sleeve portion 82 is formed with a plurality of axially extending internal splines or slots 104 for driving engagement with a toothed periphery of a plurality of first friction plates 106, 108 interleaved with a plurality of second friction plates 110, 112 splined to axial extensions 66a, 68a of forward and reverse gears 66 and 68, respectively. Opposite the end portions 96, 98 are end plates 114 and 116 that are splined into the extensions 66a, 68a, respectively. Snap rings 118, 120 are provided in grooves in the gear extensions and a disk spring 122, 124 is located respectively between each end plate 114, 116 and faces 126, 128 on respective gears 66, 68 on the shaft 58.

A compact, low wear, shift and solenoid actuator mechanism 130, best shown in FIG. 5, is provided to mechanically shift the shift collar 80 from the neutral position shown in FIG. 4 to either a forward position to the right as viewed in FIG. 4 or a reverse position to the left as shown in FIG. 4 to provide for small engagement and disengagement forces for the shift and solenoid actuator mechanism 130 of the present invention. The shift and solenoid actuator mechanism 130 includes a solenoid assembly 132 connected to a selector shaft 134 having an end 136 slidably supported in a bore 138 in a wall portion 140 of front cover 34. The selector shaft 134 thereby is positioned parallel to the input shaft 42. The opposite end 144 of the selector shaft 134 extends through wall portion 142 of end wall 48 opposite to front cover 34. A shift fork 146 is fixed to the selector shaft 134 intermediate the ends 138, 144 thereof by a set screw 148. The shift fork 146 includes a head portion 150 and an arcuate portion 152 of semi-circular form and having a plurality of circumferentially spaced pads 154, one at each end of the arc and one in the middle of the arc defined by arcuate portion 152. The pads 154 fit into a smooth sided and smooth bottomed groove 156 in the shift collar 84 so as to provide relative rotational motion between the shift collar 84 and shift fork 146 when the output shaft 58 is rotating. The shift collar 84 and the shift fork 146 are positioned for movement in an axial direction upon movement of the selector shaft 134 with respect to the housing 32.

In the embodiment of FIG. 5, the actuator shaft 134 has its end 144 slidably supported in a bore 155 through a boss 157 formed internally of the wall portion 142. The end 144 is connected by a pin 159 to an extension 158 on one end of an axially moveable core 160 of a pair of solenoid actuators 162, 164 so as to be located coaxial with the selector shaft 134 at a location on the back of the transmission casing as shown in hidden line in FIG. 3 and in side elevation in FIG. 5. The solenoids 162, 164 are connected by wires 165, 167 to a suitable controller 168 to provide selective energization to either the solenoid actuator 162 or the solenoid actuator 164. When the actuator 162 is energized, the core 166 is shifted to the left to cause the shift fork 146 and shift collar 80 to be carried by the shaft 134 in the same direction. Energization of the coil of the solenoid actuator 164 will move the solenoid core 160 to the right so as to carry the selector shaft 134, the shift fork 146 and shift collar 80 to the left. The fork and shift shaft can be returned to a mid-neutral position by return springs 170, 172. Alternatively, the coils of the actuator solenoids 160, 164 can be energized to move the fork from either the extreme right or left positions on a momentary basis to a neutral point where a detent ball 174 and detent 176 in shaft 134 can be biased by spring 178 for holding the shift fork 146 in the neutral position (not shown).

Figure 7:
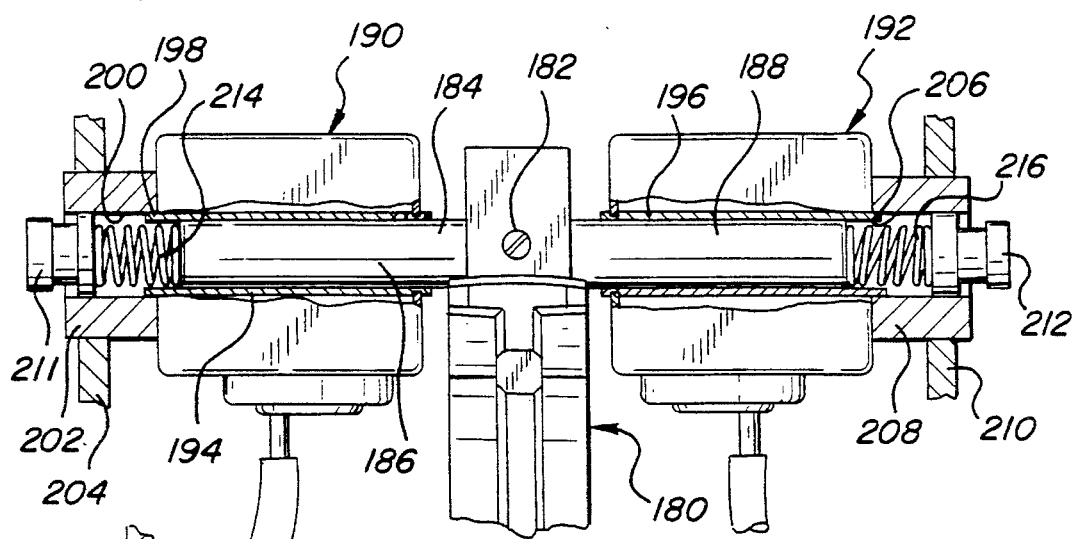
FIGS. 7–9 are side elevational views, partially sectioned, showing other embodiments of the solenoid actuated clutch mechanism of the present invention.

The embodiment of the invention shown in FIG. 7 is a more compact variation of the solenoid actuator arrangement shown in FIG. 5. In this arrangement, a shift fork 180 corresponding to the shift fork 146 is fixedly secured by a set screw 182 to an actuator shaft. 184 that is aligned as the selector shaft 134 in the first embodiment. The selector shaft 184 in this embodiment is a member that has end portions 186, 188 serving as the core elements of solenoid actuators 190, 192 corresponding to the solenoid actuators 162 and 164 in the first embodiment and operative to position the shift fork 180 in a manner like the shift fork 146 is positioned in the first embodiment. In this embodiment, each of the actuator solenoids 190, 192 includes a spool 194, 196 respectively that has the coil portions of the solenoid actuators 190, 192 wound thereon. The spool 194 has an end 198 telescoped in a bore 200 formed in a boss 202 fixedly secured by welding to a transmission housing wall 204 corresponding to the wall 140 in the embodiment of FIG. 5. Likewise, the spool 196 is fit in a bore 206 in a tubular boss 208 secured to a transmission housing wall 210 corresponding to the transmission housing wall 142 in the embodiment of FIG. 5.

A feature of the aforedescribed embodiment is that the bores 200, 206 are configured to receive plugs 211, 212 to position return springs 214, 216 respectively that are operative when the actuator coils 190, 192 are de-energized to position the shift fork 180 in the neutral position. If desired, the coils of the solenoid actuators 190, 192 can be momentarily energized to return the shaft 184 into a neutral position at which a detent assembly (as shown in FIG. 5) will be operative to hold the shift fork in the neutral position.

Figure 8:
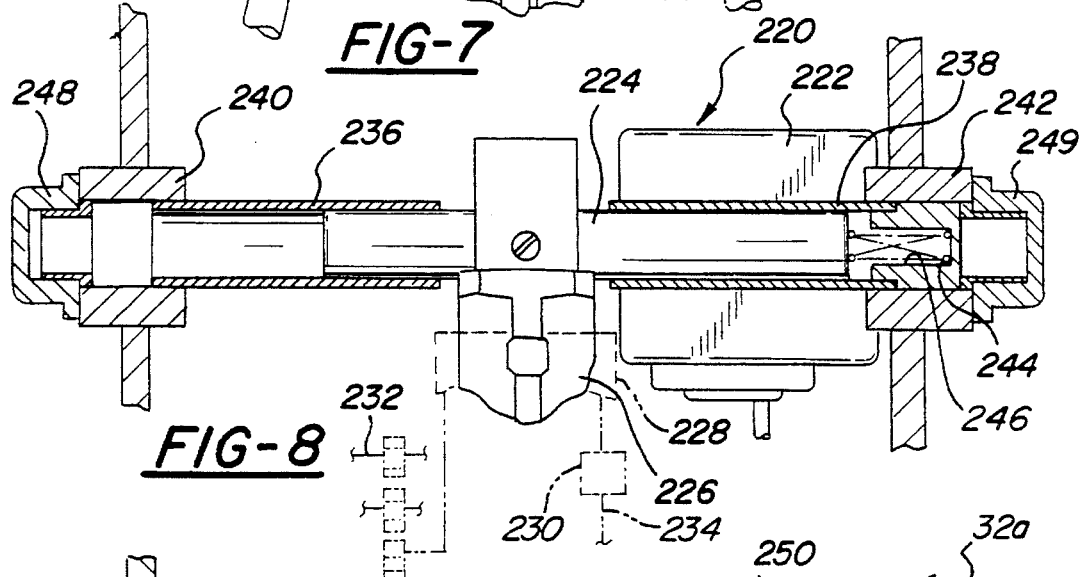

In the embodiment of FIG. 8, a solenoid actuator arrangement 200 is diagrammatically illustrated that has a single solenoid actuator 222. A core 224 is connected to a shift fork 226 that is received in a groove of a shift or selector collar 228 shown in broken outline. In this case, the collar 228 is associated with a single clutch 230, shown diagrammatically, for connecting a drive input 232 to an output drive 234. The core 224 is slidably supported in coaxially arranged spools 236, 238 connected to bosses 240, 242 corresponding to those in the embodiment of FIG. 7. A return spring 244 is located in bore 246 of a locator 248. In this embodiment, caps 248, 249 cover the bosses 240, 242.

The output drive is under the control of single clutch 230 that can be of any desired type such as friction clutch packs or cone drive clutches or the like wherein movement of a shift collar is utilized to actuate the clutch to couple a driving member to an output shaft and wherein during such shifting the shift collar is rotated with respect to a shift or selector fork coupled to the shift collar by a smooth groove that provides for relative rotation between the selector fork and the shift collar during the shift operation. While shown with the solenoid actuator arrangement 220 with an inboard and fixed solenoid, it will be understood by those skilled in the art that outboard fixed (FIG. 5) and inboard slidable (FIG. 9) arrangements can be used to actuate a single clutch.

Figure 9:
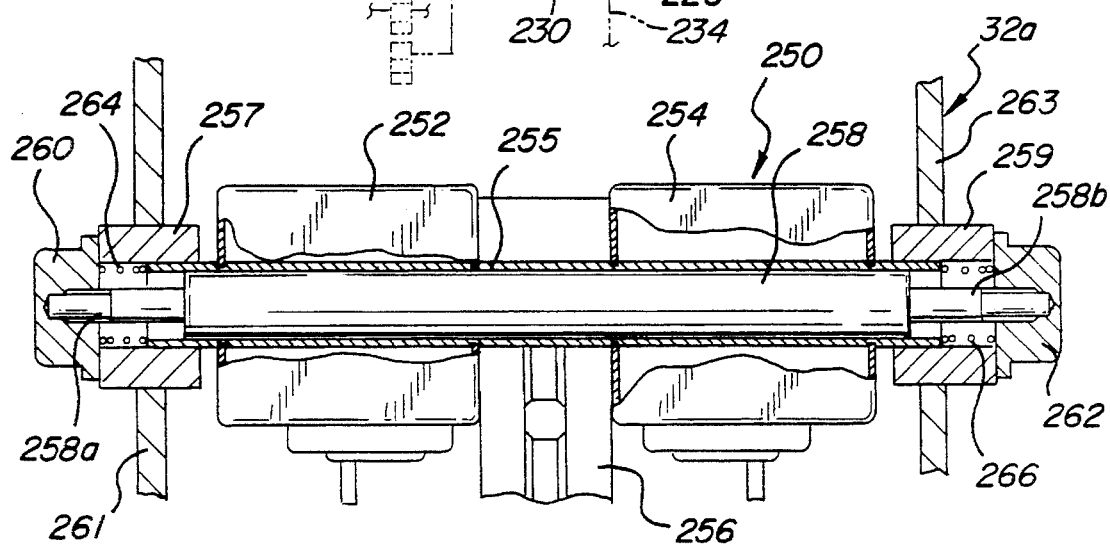

Another alternative arrangement, diagrammatically shown in FIG. 9, has a solenoid actuator arrangement 250 including solenoids 252, 254 having their coils fixed for movement with a shift fork 256, shown partially broken away but corresponding to the forks of the other embodiments. The coils of solenoids 252, 254 are connected to a spool 255 having opposite ends slidably mounted in bushings 257, 259. The bushings 257, 259 are fixed to end walls 261, 263 of a housing 32a. The shift fork 256 and solenoids 252, 254 are thereby slidably mounted on a center rod 258 that is fixed to the transmission case or housing 32a by threaded ends 258a, 258b and caps 260, 262. In this embodiment, centering springs 264, 266 are provided to return the shift fork 256 to a neutral position when the solenoids 252, 254 are de-energized.

In the embodiment of FIG. 5 and FIG. 7, the coils of the solenoid actuators are secured to the transmission housing so that operation thereof will be able to accomplish direct, short stroke operation of the shift forks.

In the embodiment of FIG. 9, the solenoids are moveable on a fixed rod. In each of the aforesaid embodiments, the shift fork, solenoids and shift collar can be used to shift either a single or dual clutch arrangement depending upon the transmission application. In all cases the solenoids are arranged coaxially of the selector fork and are coupled to the selector fork either through a selector shaft or directly to the selector fork for causing the desired direct short stroke operation of the shift fork while it is connected to a smooth sided and bottomed groove of a shift or selector collar so that there is always relative rotational motion between the selector fork and the selector collar when the output shaft is rotating.

Industrial Applicability

The described ball screw actuated clutch structure with friction disk packs can be provided with cone clutches of the type shown in U.S. Pat. No. 4,966,267, incorporated herein by reference. The solenoid actuated mechanical clutches of the invention are useful in transmissions or any place where a mechanical clutch is desired that has a high torque capacity in small engagement and disengagement forces. As shown above, the clutch arrangement is particularly useful in a marine transmission where only forward and reverse gears are required and wherein a neutral operative position is provided.

What is claimed is:

1. A clutching arrangement for use in a transmission having a transmission housing, an input shaft and an output shaft and at least one clutching device therebetween for actuation of the output shaft and a shift collar encompassing the output shaft for selectively positioning the clutching device to couple the output shaft to the input shaft, the shift collar encompassing the output shaft and rotatable therewith and having a groove formed therein, the improvement comprising; a selector shaft; a shift fork having a segment located in said groove and relatively rotatable therein; said shift fork including a head portion operatively connected to said selector shaft;

a solenoid coaxially arranged with respect to said selector shaft and selectively operatively connected to said selector shaft for shifting said shift fork with respect to said transmission housing for moving said shift collar to selectively operate said clutching device for actuation of the output shaft.

2. A clutch arrangement as set forth in claim 1 further comprising a solenoid core connected to one end of said selector shaft for moving said selector shaft with respect to the transmission housing.

3. A clutch arrangement as set forth in claim 1 wherein a pair of solenoids are connected to said selector shaft at one end thereof.

4. A clutch arrangement as set forth in claim 1 wherein a pair of solenoids is located on opposite sides of said shift collar.

5. A clutch arrangement as set forth in claim 4 wherein said selector shaft includes opposite ends forming core elements for said pair of solenoids.

6. A clutch arrangement as set forth in claim 4 wherein said pair of solenoids each include a spool connected to said transmission housing for forming a guide for movement of said selector shaft with respect to said transmission housing.

7. A clutch arrangement as set forth in claim 1, in which said coil housing is connected to said transmission housing.

8. A clutch arrangement as set forth in claim 1, further comprising a boss on said transmission housing;

and a spring in said boss for returning said shaft to a neutral position.

9. A clutch arrangement as set forth in claim 1, in which a coil housing is connected to said transmission housing.

10. A clutch arrangement as set forth in claim 1, in which a coil housing is connected to said shift fork for causing relative movement of said shift fork on said selector shaft and wherein said selector shaft is fixed against movement with respect to said transmission housing.

11. A clutch arrangement as set forth in claim 1, including a pair of springs operatively arranged to position said selector shaft in a neutral position.

12. A clutch arrangement as set forth in claim 11 further comprising a boss on said transmission housing;

and a spring in said boss for returning said shaft to a neutral position.

13. A clutching arrangement for use in a transmission having forward and reverse gears, wherein the transmission includes a transmission housing, an input shaft, an output shaft, axially spaced first forward and reverse gears mounted for rotation with the input shaft, axially spaced second forward and reverse gears mounted for rotation on the output shaft, said forward gears on the two shafts being in meshing engagement, an idler shaft carrying an idler gear in meshing engagement with the reverse gears on the two shafts, and a clutching device encompassing the output shaft for actuation of the output shaft in either the forward or reverse direction, a shift collar encompassing the output shaft and a pair of opposed clutch devices forming a first clutch between the shift collar and the second forward gear and a second clutch between the shift collar and the second reverse gear, the shift collar being a unitary member having an inner cylindrical sleeve portion and an outer cylindrical sleeve portion joined by a radial flange; the inner sleeve portion encompassing the output shaft and the outer sleeve portion having a groove formed therein, the improvement comprising; an selector shaft; a shift fork supported on said outer cylindrical sleeve portion; said shift fork having a semi-circular segment and including a head portion connected to said selector shaft for movement therewith;

a reverse solenoid and a forward solenoid selectively operatively connected to said selector shaft for shifting said selector shaft with respect to the transmission housing for moving said shift collar for selectively operating said clutching devices for actuation of the output shaft in either the forward or reverse direction.

14. A clutch arrangement as set forth in claim 13 further comprising a solenoid core connected to one end of said selector shaft for moving said selector shaft with respect to the transmission housing.

15. A clutch arrangement as set forth in claim 13 wherein a pair of solenoids is located on opposite sides of said shift collar.

16. A clutch arrangement as set forth in claim 15 wherein said shaft includes opposite ends forming core elements for said pair of solenoids.

17. A clutch arrangement as set forth in claim 15 wherein said first and second solenoids each include a spool connected to said transmission housing for forming a guide for movement of said shaft with respect to said transmission housing.

18. A clutch arrangement as set forth in claim 15, in which said solenoids include a coil housing connected to said transmission housing.

19. A clutch arrangement as set forth in claim 15 further comprising a boss on said transmission housing;

and a spring in said boss for returning said shaft to a neutral position.

20. A clutch arrangement as set forth in claim 13, in which said solenoids include a coil housing connected to said transmission housing.

21. A clutch arrangement as set forth in claim 13, including a pair of springs operatively arranged to position said shaft in a mid neutral position.

22. A clutch arrangement as set forth in claim 20 further comprising a boss on said transmission housing;

and a spring in said boss for returning said shaft to a neutral position.

23. A clutch arrangement as set forth in claim 13, in which a coil housing is connected to said shift fork for causing relative movement of said shift fork on said selector shaft and wherein said selector shaft is fixed against movement with respect to said transmission housing.

24. A clutch arrangement as set forth in claim 3, in which said coil housing is connected to said transmission housing.

25. A clutch arrangement as set forth in claim 3, further comprising a boss on said transmission housing;

and a spring in said boss for returning said shaft to a neutral position.

26. A clutch arrangement as set forth in claim 3, in which a coil housing is connected to said transmission housing.

27. A clutch arrangement as set forth in claim 3, in which a coil housing is connected to said shift fork for causing relative movement of said shift fork on said selector shaft and wherein said selector shaft is fixed against movement with respect to said transmission housing.

28. A clutch arrangement as set forth in claim 3, including a pair of springs operatively arranged to position said selector shaft in a neutral position.

* * * * *